United States Patent

Son

(10) Patent No.: US 9,459,759 B2
(45) Date of Patent: Oct. 4, 2016

(54) METHOD FOR DISPLAYING CONTENTS USE HISTORY AND ELECTRONIC DEVICE THEREOF

(71) Applicant: Samsung Electronics Co., Ltd., Gyeonggi-do (KR)

(72) Inventor: Sung-Ho Son, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 279 days.

(21) Appl. No.: 14/019,880

(22) Filed: Sep. 6, 2013

(65) Prior Publication Data

US 2014/0181747 A1    Jun. 26, 2014

(30) Foreign Application Priority Data

Dec. 20, 2012  (KR) .......................... 10-2012-149620

(51) Int. Cl.
| | |
|---|---|
| *G06F 3/0481* | (2013.01) |
| *G06F 9/44* | (2006.01) |
| *G06Q 10/10* | (2012.01) |
| *H04M 1/725* | (2006.01) |

(52) U.S. Cl.
CPC ......... *G06F 3/04817* (2013.01); *G06F 9/4443* (2013.01); *G06Q 10/10* (2013.01); *H04M 1/72522* (2013.01); *H04M 2250/22* (2013.01); *H04M 2250/60* (2013.01)

(58) Field of Classification Search
CPC .................................................. G06F 3/04817
USPC ....................................................... 715/835
See application file for complete search history.

(56) References Cited

U.S. PATENT DOCUMENTS

| | | | | |
|---|---|---|---|---|
| 6,086,618 A | * | 7/2000 | Al-Hilali ............. | G06F 11/3447 703/2 |
| 6,148,294 A | * | 11/2000 | Beyda ................ | G06F 17/30126 |
| 8,196,051 B2 | * | 6/2012 | Zaner et al. .................. | 715/758 |
| 8,223,370 B2 | * | 7/2012 | Kawano ............. | H04N 1/00244 358/1.1 |
| 2004/0064511 A1 | * | 4/2004 | Abdel-Aziz ........ | H04L 12/5835 709/206 |
| 2005/0138177 A1 | * | 6/2005 | Davis .................. | H04L 29/1216 709/227 |
| 2005/0226530 A1 | * | 10/2005 | Murayama .............. | G06T 11/60 382/276 |
| 2007/0234200 A1 | * | 10/2007 | Farn ....................... | G06Q 10/10 715/234 |
| 2007/0294687 A1 | * | 12/2007 | Masselle ................... | G06F 8/62 717/174 |

(Continued)

FOREIGN PATENT DOCUMENTS

| | | |
|---|---|---|
| EP | 1 233 599 A2 | 8/2002 |
| KR | 10-2007-0101486 A | 10/2007 |

(Continued)

OTHER PUBLICATIONS

WPprobusiness, "FooBox WordPress Plugin Tutorial—Social Icons Settings", available at <https://www.youtube.com/watch?v=H826PebqmiM>, published on Sep. 3, 2012, 4 pages.*

*Primary Examiner* — Reza Nabi
*Assistant Examiner* — Daniel Rodriguez
(74) *Attorney, Agent, or Firm* — Cha & Reiter, LLC

(57) ABSTRACT

A method for displaying a contents use history and an electronic device thereof are provided. The method for displaying the use history of contents in the electronic device includes sensing a contents display event and, upon sensing the event, displaying contents and concurrently displaying in any region of the contents an icon of at least one application that has used the contents.

5 Claims, 9 Drawing Sheets

(56) References Cited

U.S. PATENT DOCUMENTS

| | | | | |
|---|---|---|---|---|
| 2008/0005698 A1* | 1/2008 | Koskinen | G06F 3/0481 | |
| | | | 715/835 | |
| 2008/0077676 A1* | 3/2008 | Nagarajan et al. | 709/206 | |
| 2008/0172663 A1* | 7/2008 | Lee | H04L 51/38 | |
| | | | 717/173 | |
| 2009/0199106 A1* | 8/2009 | Jonsson | G06F 17/30884 | |
| | | | 715/744 | |
| 2012/0017178 A1* | 1/2012 | Mulloy et al. | 715/835 | |
| 2012/0151397 A1* | 6/2012 | Oberstein | G06F 17/30126 | |
| | | | 715/769 | |
| 2012/0159334 A1* | 6/2012 | Messerly | G06F 9/543 | |
| | | | 715/733 | |
| 2012/0229505 A1* | 9/2012 | Kuga | G01C 21/00 | |
| | | | 345/629 | |
| 2012/0324002 A1* | 12/2012 | Chen | G06F 17/30274 | |
| | | | 709/204 | |
| 2013/0047123 A1* | 2/2013 | May | G06F 3/0482 | |
| | | | 715/834 | |
| 2013/0067027 A1* | 3/2013 | Song | H04N 1/00244 | |
| | | | 709/217 | |
| 2013/0086023 A1* | 4/2013 | Tsukamoto | 707/705 | |
| 2013/0239063 A1* | 9/2013 | Ubillos | H04L 51/24 | |
| | | | 715/838 | |
| 2013/0262590 A1* | 10/2013 | Patil | G06Q 10/107 | |
| | | | 709/206 | |
| 2014/0062926 A1* | 3/2014 | Hwang | H04W 4/206 | |
| | | | 345/173 | |
| 2014/0164514 A1* | 6/2014 | Eteminan | H04L 29/06176 | |
| | | | 709/204 | |
| 2014/0181113 A1* | 6/2014 | Kim | G06F 17/30126 | |
| | | | 707/740 | |
| 2014/0188803 A1* | 7/2014 | James | G06F 17/30174 | |
| | | | 707/638 | |
| 2014/0372905 A1* | 12/2014 | Bryant | G06Q 10/10 | |
| | | | 715/753 | |
| 2015/0033123 A1* | 1/2015 | Arrasvuori | G06F 3/165 | |
| | | | 715/716 | |
| 2015/0086092 A1* | 3/2015 | Itada | G06F 17/30244 | |
| | | | 382/128 | |

FOREIGN PATENT DOCUMENTS

| | | | |
|---|---|---|---|
| KR | 10-2012-0028491 A | 3/2012 | |
| WO | 2011/158418 A1 | 12/2011 | |
| WO | WO 2011158418 A1 * | 12/2011 | |

* cited by examiner

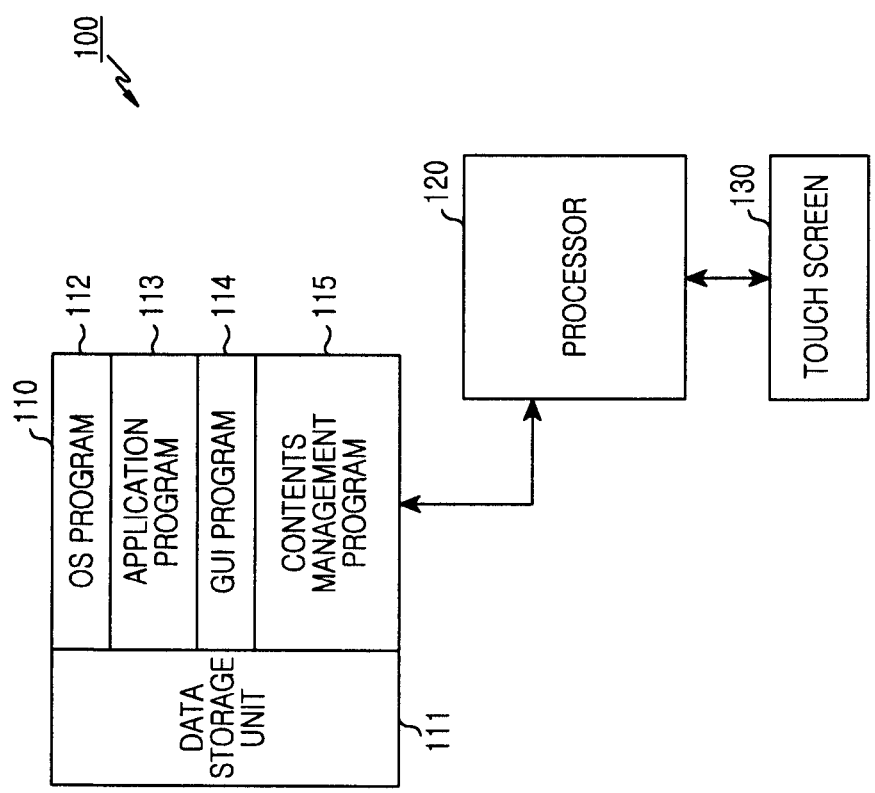

METHOD FOR DISPLAYING CONTENTS USE HISTORY AND ELECTRONIC DEVICE THEREOF

CLAIM OF PRIORITY

This application claims priority under 35 U.S.C. §119(a) to a Korean Patent Application filed in the Korean Intellectual Property Office on Dec. 20, 2012 and assigned Serial No. 10-2012-149620, the contents of which are herein incorporated by reference.

BACKGROUND

1. Field of the Invention

The present disclosure relates to a method for displaying contents and an electronic device thereof.

2. Description of the Related Art

Advances in technology have led to electronic devices with diverse functions. For example, certain electronic devices may simultaneously provide an alarm function, a Short Messaging Service (SMS) function, a Multimedia Message Service (MMS) function, an electronic mail (e-mail) function, a game function, a communication function, an image management function, a multimedia function of providing audio and video contents, a scheduling function and the like.

As the functions of the electronic device increase, the number of contents stored in the electronic equally increases. Accordingly, a situation occurs in which a user transmits the contents. For example, to share image files stored in the electronic device with other users, the user can upload the image files to a specific server. As another example, to share music files stored in the electronic device with the other users, the user can transmit the music files to electronic devices of the other users.

However, if there are many contents to transmit, it becomes difficult for the user to identify a transmission history of each of the contents by checking the applications that have transmitted the contents one by one in order to.

Accordingly, there is a need to provide an electronic device and a method for enabling a user to easily recognize a transmission history of contents.

SUMMARY

An aspect of the present invention is to substantially solve at least the above problems and/or disadvantages and to provide at least the advantages below. Accordingly, one aspect of the present invention is to provide a method and apparatus for storing a use history of contents in an electronic device.

Another aspect of the present invention is to provide a method and apparatus for displaying contents and concurrently displaying a history indicating an application that has used the contents in an electronic device.

A further aspect of the present invention is to provide a method and apparatus for, when a touch for an application that has used contents is sensed, executing the touch sensed application in an electronic device.

Yet another aspect of the present invention is to provide a method and apparatus for, when a touch for an application that has used contents is sensed, displaying a page in which contents in the touch sensed application in an electronic device.

The above aspects are achieved by providing a method for displaying a contents use history and an electronic device thereof.

According to one aspect of the present invention, a method for displaying a use history of contents in an electronic device is provided. The method includes sensing a contents display event and, upon sensing the event, displaying contents and concurrently displaying in any region of the contents an icon of at least one application that has used the contents have been used.

According to another aspect of the present invention, an electronic device displaying a use history of contents is provided. The electronic device includes one or more processors for executing computer programs, a touch-sensitive display for detecting the presence and location of a touch, a memory for storing data and instructions, and one or more programs stored in the memory and configured to be executable by the one or more processors. The program includes an instruction of sensing a contents display event and, upon sensing the event, displaying contents and concurrently displaying in any region of the contents an icon of at least one application that has used the contents have been used.

BRIEF DESCRIPTION OF THE DRAWINGS

The above features and advantages of the present invention will become more apparent from the following detailed description when taken in conjunction with the accompanying drawings in which:

FIG. 1A is a block diagram illustrating a construction of an electronic device for displaying contents and concurrently displaying a use history of the contents according to an exemplary embodiment of the present invention;

DETAILED DESCRIPTION

Figure 1B:
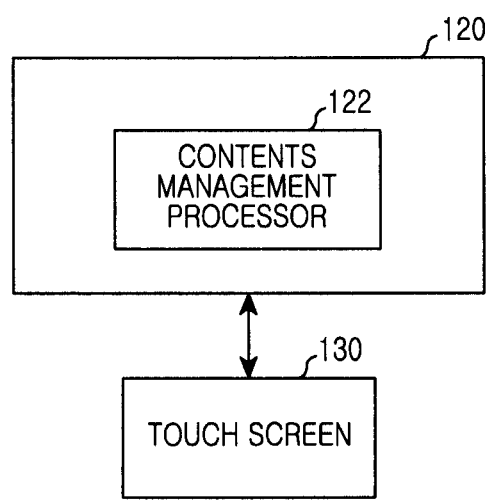
FIG. 1B is a block diagram illustrating a construction of a processor for displaying contents and concurrently displaying a use history of the contents according to an exemplary embodiment of the present invention.

Preferred embodiments of the present invention will be described herein below with reference to the accompanying drawings. For the purposes of clarity and simplicity, well-known functions or constructions are not described in detail as they would obscure the invention in unnecessary detail. And, terms described below, which are defined considering functions in the present invention, can be different depending on user and operator's intention or practice. Therefore, the terms should be defined on the basis of the disclosure throughout this specification.

In the following description, an electronic device includes a mobile communication terminal in which contents display is possible, a smart phone, a tablet Personal Computer (PC), a digital camera, an MPEG Audio Layer-3 (MP3) player, a laptop computer, a netbook, a computer, a television, a refrigerator, an air conditioner and the like.

The present disclosure relates an apparatus and a method for displaying a use history of contents in an electronic device.

FIG. 1A illustrates a construction of an electronic device for displaying contents and concurrently displaying a use history of the contents according to an exemplary embodiment of the present invention.

Referring to FIG. 1A, the electronic device 100 may include a memory 110, a processor 120, and a touch screen 130. The memory 110 and the processor 120 can be composed of a plurality of memories 110 and a plurality of processors 120, respectively, or any combination thereof.

The memory 110, for example, may include a data storage unit 110, an Operating System (OS) program 112, an application program 113, a Graphical User Interface (GUI) program 114, a contents management program 115, and the like. Also, a program, which is a software constituent element stored in the memory 110, may be expressed as a set of instructions stored in a computer readable medium. Therefore, the program is sometimes expressed as an instruction set. The program may also be expressed as a module.

The memory 110 can store one or more programs including instructions for performing an exemplary embodiment of the present invention.

The data storage unit 111 stores data that are generated while performing a function corresponding to the program stored in the memory 110. According to an exemplary embodiment of the present invention, the data storage unit 111 stores use history information of each content. Here, the use history information of the content represents information of an application that has used the contents has been used. For example, the data storage unit 111 can store information indicating that a first group of contents has been used in a message application and a Social Network Service (SNS) application. For another example, the data storage unit 111 can store information indicating that a second group of contents has been used in a Bluetooth application. Here, the contents may include video contents, text contents, image contents, sound contents, and other application program contents.

Further, the data storage unit 111 can store information that contents have been used in an application. For instance, if the first group of contents is transmitted to other user through a message application, the data storage unit 111 can store information about to which user the first group of contents has been transmitted through the message application, together with information indicating that the first group of contents has been used in the message application. For further instance, if the second group of contents is uploaded to a server through an SNS application, the data storage unit 111 can store information about to which page the second group of contents has been uploaded through the SNS application, together with information indicating that the second group of contents has been used in the SNS application.

The OS program 112, for example, may be a built-in operating system such as WINDOWS, LINUX, Darwin, RTXC, UNIX, OS X, or VxWorks, and may include various software constituent elements controlling general system operation. For example, control of the general system operation means memory management and control, storage hardware (device) control and management, power control and management and the like. Further, the OS program 112 performs a function of making smooth communication between various hardware (devices) and software constituent elements (programs).

The application program 113 may include applications of a browser, an e-mail, a message, word processing, an address book, a widget, Digital Right Management (DRM), voice recognition, voice replication, a position determining function, a location-based service, a telephone and the like.

The GUI program 114 includes at least one software constituent element for providing a user interface using a graphic between a user and the electronic device 100. That is, the GUI program 114 includes at least one software constituent element for displaying user interface information on the touch screen 130. According to an exemplary embodiment of the present invention, the GUI program 114 may include an instruction for displaying contents and concurrently displaying information (for example, an application icon) about at least one application that has used the contents have been used.

The contents management program 115 includes an instruction for storing use history information about each content. That is, the contents management program 115 includes an instruction for sensing whether each content stored in the electronic device is used in a specific application and, if the use in the specific application is sensed, storing information indicating that the content is used in the specific application. For example, the contents management program 115 senses that the first group of contents is transmitted to other electronic device through an SNS application and stores, as use history information of the first group of contents, information indicating that the first group of contents has been transmitted to the other electronic device through the SNS application. Also, the contents management program 115 includes an instruction for, upon displaying contents, displaying use history information of the contents. That is, the contents management program 115 includes an instruction for displaying contents and concurrently displaying an icon of an application that has used the contents have been used. In detail, the contents management program 115 senses a contents display event and, upon sensing the contents display event, the contents management program 115 determines if there is an application that has used the corresponding contents, on the basis of use history information about the corresponding contents. For example, if a gallery application is executed, the contents management program 115 searches use history information about image contents to be displayed in the gallery application, and determines whether there is an application that has used the image contents to be displayed have been used.

If there is at least one application that has used corresponding image contents have been used, the contents management program 115 displays the image contents and concurrently displays an icon of the at least one application that has used the image contents have been used. For example, if a first group of image contents is appended and transmitted to other electronic device through a message application, the contents management program 115 can display the first group of image contents and concurrently display an icon of the message application that has used the first group of image contents has been used. As another example, if second group of image contents is uploaded to a server through an SNS application, the contents management program 115 can display the second group of image contents and concurrently display an icon of the SNS application that has used the second group of image contents has been used. For further example, if a third group of image contents is appended and transmitted to other electronic device through the message application and are uploaded to the server through the SNS application, the contents management program 115 can display the third group of image contents and concurrently display icons of the message application and the SNS application that has used the third group of image contents has been used.

Further, the contents management program 115 may include an instruction for, if a touch for an application icon displayed concurrently with contents is sensed, displaying information that the contents have been used by the application represented by the touched icon. For example, if a touch for an icon of a message application displayed as a use history of the first group of contents is sensed, the contents management program 115 can display IDentification (ID) information of at least one other electronic device to which the first group of contents has been transmitted through the message application. Here, the ID information of the other electronic device includes at least one of an Internet Protocol (IP) address of the other electronic device, a device number, a user name, and a phone number. As another example, if a touch for an icon of an SNS application displayed as a use history of the second group of contents is sensed, the contents management program 115 can execute the SNS application and then, display a page to show that the second group of contents is uploaded in the SNS application. For further example, if a touch for an icon of a Bluetooth application displayed as a use history of a third group of contents is sensed, the contents management program 115 can display ID information of at least one other electronic device to which the third group of contents is transmitted through the Bluetooth application. At this time, the ID information of the other electronic device to which the third group of contents has been transmitted and the page information to which the second group of contents has been uploaded can be displayed by page turning or can be displayed by a new window of a pop-up form.

The processor 120 may include at least one processor and peripheral interface. Also, the processor 120 may execute the specific program (i.e., instruction set) stored in the memory 110 and may perform a specific plurality of functions corresponding to the program.

The touch screen 130, a touch-sensitive display, provides an interface for input/output between the electronic device 100 and a user. The touch screen 130 is a medium of sensing a touch (or contact) through a touch sensor (not shown), forwarding the sensed touch input to the electronic device 100, and visually providing a user with an output from the electronic device 100. That is, in response to a touch input, the touch screen 130 provides the user with a visual output based on a text, a graphic and a video.

The touch screen 130 may include a touch-sensitive surface for sensing a user's touch input and thus, senses the user's touch input in a haptic contact method, a tactile contact method or a combination of them. For example, a touch-sensitive point of the touch screen 130 corresponds to a digit of a finger that is used for contact on the touch-sensitive surface. Also, the touch screen 130 senses a contact of an external device such as a stylus pen and the like through the touch-sensitive surface. The detected contact converts into interaction corresponding to a user interface object (for example, a soft key) displayed on the touch screen 130.

The touch screen 130 provides an interface for touch input/output between the electronic device 100 and a user. In detail, the touch screen 130 is a medium for forwarding a user's touch input to the electronic device 100, and visually providing the user with an output from the electronic device 100. The touch screen 130 may use various display technologies such as a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED) and the like. The touch screen 130 of the present invention is not limit to a touch screen using these display technologies. Also, the touch screen 130 can sense the start of a contact on a touch-sensitive surface, the movement of the contact or the interruption or end of the contact, by using various touch detection (or sensing) technologies such as capacitive detection, resistive detection, infrared detection and surface acoustic wave detection technologies. Upon sensing a contents display event, the touch screen 130 according to the present invention can display contents and concurrently display an icon of an application that has used the contents. Also, the touch screen 130 can sense a touch for the icon displayed concurrently with the contents.

FIG. 1B illustrates a construction of a processor for displaying contents and concurrently displaying a use history of the contents according to an exemplary embodiment of the present invention.

Referring to FIG. 1B, the processor 120 includes a contents management processor 122.

The contents management processor 122 includes an instruction for storing use history information about each content. That is, the contents management processor 122 includes an instruction for sensing whether each content stored in an electronic device is used in a specific application and, if the use in the specific application is sensed, storing information indicating that the content is used in the specific application. For example, the contents management processor 122 senses that the first group of contents is transmitted to other electronic device through an SNS application and stores, as use history information of the first group of contents, information indicating that the first group of contents has been transmitted to the other electronic device through the SNS application. Also, the contents management processor 122 includes an instruction for, upon displaying contents, displaying use history information of the contents. That is, the contents management processor 122 includes an instruction for displaying contents and concurrently displaying an icon of an application that has used the contents. In detail, the contents management processor 122 senses a contents display event and, upon sensing the contents display event, the contents management processor 122 determines if there is an application that has used corresponding contents, on the basis of use history information about the corresponding contents. For example, if a gallery application is executed, the contents management processor 122 searches use history information about image contents to be displayed in the gallery application, and determines whether there is an application that has used the image contents to be displayed.

If there is at least one application that has used corresponding image contents, the contents management processor 122 displays the image contents and concurrently displays an icon of the at least one application that has used the image contents. For example, if a first group of image contents has appended and transmitted to other electronic device through a message application, the contents management processor 122 can display the first group of image contents and concurrently display an icon of the message application that has used the first group of image contents has been used. In another example, if second group of image contents is uploaded to a server through an SNS application, the contents management processor 122 can display the second group of image contents and concurrently display an icon of the SNS application that has used the second group of image contents has been used. As a further example, if a third group of image contents is appended and transmitted to other electronic device through the message application and are uploaded to the server through the SNS application, the contents management processor 122 can display the third group of image contents and concurrently display icons of the message application and the SNS application that has used the third group of image contents.

Further, the contents management processor 122 may include an instruction for, if a touch for an application icon displayed concurrently with contents is sensed, displaying information that the contents have been used by the application represented by the touched icon. For example, if a touch for an icon of a message application displayed as a use history of the first group of contents is sensed, the contents management processor 122 can display ID information of at least one other electronic device to which the first group of contents has been transmitted through the message application. Here, the ID information of the other electronic device includes at least one of an IP address of the other electronic device, a device number, a user name, and a phone number. In another example, if a touch for an icon of an SNS application displayed as a use history of the second group of contents is sensed, the contents management processor 122 can execute the SNS application and then, display a page to which the second group of contents is uploaded in the SNS application. As a further example, if a touch for an icon of a Bluetooth application displayed as a use history of a third group of contents is sensed, the contents management processor 122 can display ID information of at least one other electronic device to which the third group of contents is transmitted through the Bluetooth application. At this time, the ID information of the other electronic device to which the third group of contents has been transmitted and the page information to which the second group of contents has been uploaded may be displayed by page turning or may be displayed by a new window of a pop-up form.

Figure 2A:
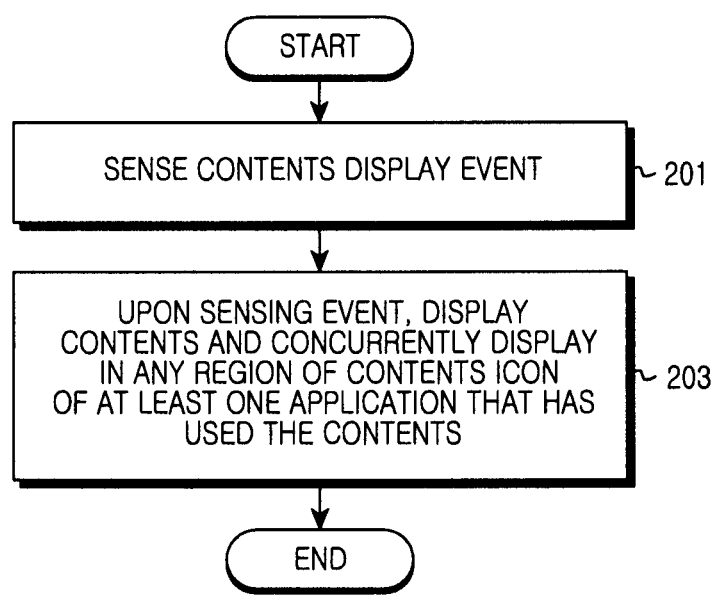
FIG. 2A is a flowchart illustrating a procedure for displaying contents and a contents use history in an electronic device according to an exemplary embodiment of the present invention.

FIG. 2A illustrates a procedure for displaying contents and a contents use history in an electronic device 100 according to an exemplary embodiment of the present invention.

Referring to FIG. 2A, in step 201, the electronic device 100 senses a contents display event. For example, the electronic device 100 may sense that a gallery application is executed and image contents are displayed. For another example, the electronic device 100 may sense that a music application is executed and sound contents are displayed. As a further example, the electronic device 100 may sense that a video application is executed and video contents are displayed.

Next, the electronic device 100 proceeds to step 203 and, upon sensing the contents display event, displays contents and concurrently displays in any region of the contents an icon of at least one application that has used the contents. In detail, the electronic device 100 determines whether there is at least one application that has used contents to be displayed and then, if there is the at least one application that has used the contents to be displayed, the electronic device 100 displays an icon of the at least one application that has used the contents, concurrently with the contents. For example, if the contents to be displayed are the first group of image contents, the electronic device 100 can determine whether there is a message application that has used the first group of image contents has been used, and display in any region of the first group of image contents an icon of the message application that has used the first group of image contents has been used. For another example, if the contents to be displayed are first group of document contents, the electronic device 100 can determine whether there is a Bluetooth application that has used the first group of document contents has been used, and display in any region of the first group of document contents an icon of the Bluetooth application that has used the first group of document contents has been used.

Figure 2B:
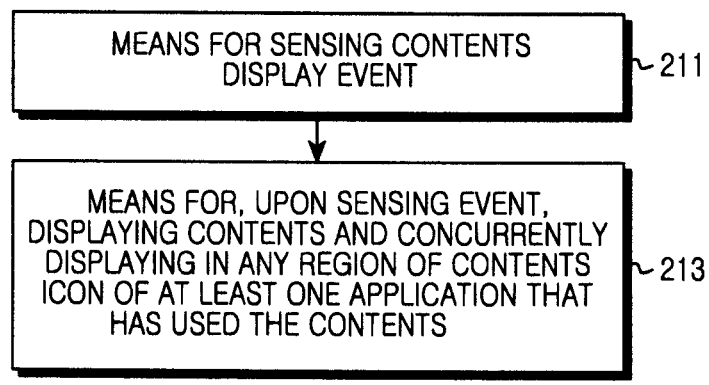
FIG. 2B is a diagram illustrating a means for displaying contents and a contents use history in an electronic device according to an exemplary embodiment of the present invention.

FIG. 2B illustrates a means for displaying contents and a contents use history in an electronic device according to an exemplary embodiment of the present invention.

Referring to FIG. 2B, in step 201, the electronic device 100 includes a means 211 for sensing a contents display event. For example, the electronic device 100 may include a means for sensing whether, after a gallery application is executed, a first image is selected and displayed among image contents stored in the gallery application. As another example, the electronic device 100 can include a means for sensing whether, after a music application is executed, a first group of sound contents is selected and displayed among sound contents stored in the music application.

Also, the electronic device 100 includes a means 213 for, upon sensing an event, displaying contents and concurrently displaying in any region of the contents an icon of at least one application that has used the contents. Further, the electronic device 100 includes a means for storing information about an application that has used contents and a means for storing information of the contents. For example, the electronic device 100 may include a means for storing information that first group of contents is used in a message application and a means for storing information about to which electronic device the first group of contents has been transmitted by the message application.

Further, the electronic device 100 can include a means for storing, by contents, information about an application that has used contents and information that the contents are used in the application.

Figure 3:
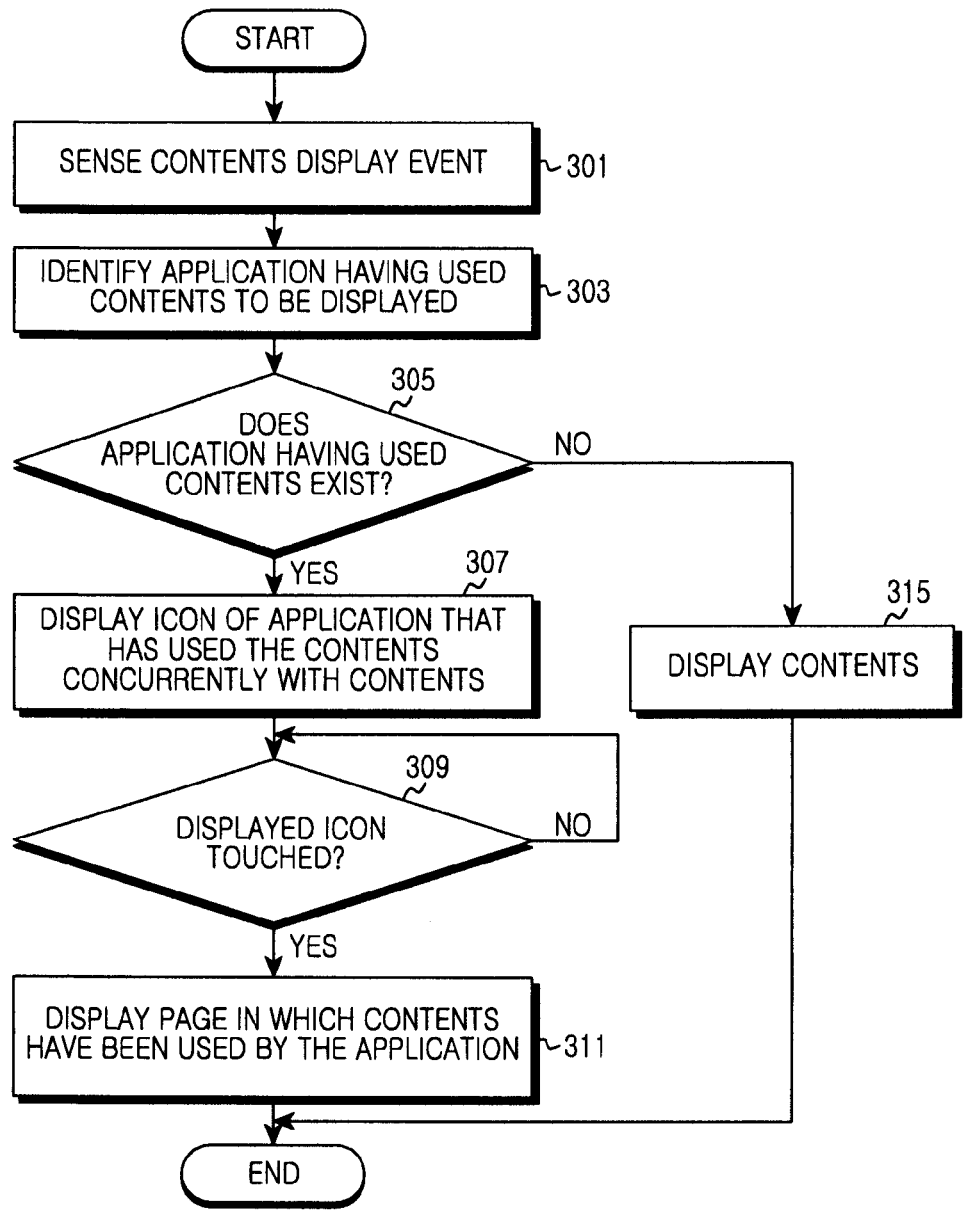
FIG. 3 is a flowchart illustrating a procedure for displaying contents and an icon of an application that has used the contents in an electronic device according to an exemplary embodiment of the present invention.

FIG. 3 illustrates a procedure for displaying contents and an icon of an application that has used the contents in an electronic device 100 according to an exemplary embodiment of the present invention.

Referring to FIG. 3, in step 301, the electronic device 100 can sense a contents display event. In other words, the electronic device 100 can sense an event for displaying contents stored in the electronic device 100. Here, the contents may include video contents, text contents, image contents, sound contents, and other application program contents.

After that, the electronic device 100 proceeds to perform step 303 and identifies an application that has used contents to be displayed and then, proceeds to step 305 and determines if there is an application that has used the contents. The electronic device 100 determines whether there is an application that has used the contents by searching the use history information of the contents stored in the data storage unit 111. In other words, the electronic device 100 determines whether the contents to be displayed have been appended or referred by a specific application.

Figure 4:
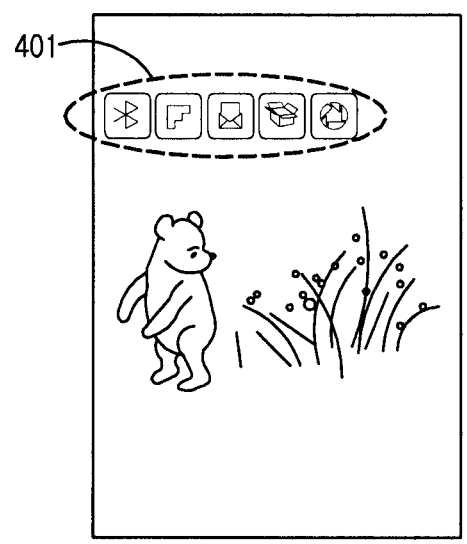
FIG. 4 is a diagram illustrating an example of concurrently displaying image contents and an icon of an application that has used the image contents in an electronic device according to another exemplary embodiment of the present invention.

If it is determined in step 305 that there is an application that has used the contents, the electronic device 100 proceeds to perform step 307 and displays an icon of the application that has used the contents, concurrently with the contents. Otherwise, the electronic device 100 proceeds to perform step 315 and displays the contents. For example, if music contents are used by a Bluetooth application, the electronic device 100 can display in any region of the music contents an icon of the Bluetooth application that has used the music contents. In another example, if text contents are used by an SNS application, the electronic device 100 can display in any region of the text contents an icon of the SNS application that has used the text contents. As a further example, if image contents are used by a plurality of applications, as illustrated in FIG. 4, the electronic device 100 can display a plurality of application icons 401 in any region of the image contents.

Next, the electronic device 100 proceeds to perform step 309 and senses whether a displayed icon has been touched. At this time, by sensing whether the displayed icon is touched, the electronic device 100 can determine whether the displayed icon is selected.

Figure 5:
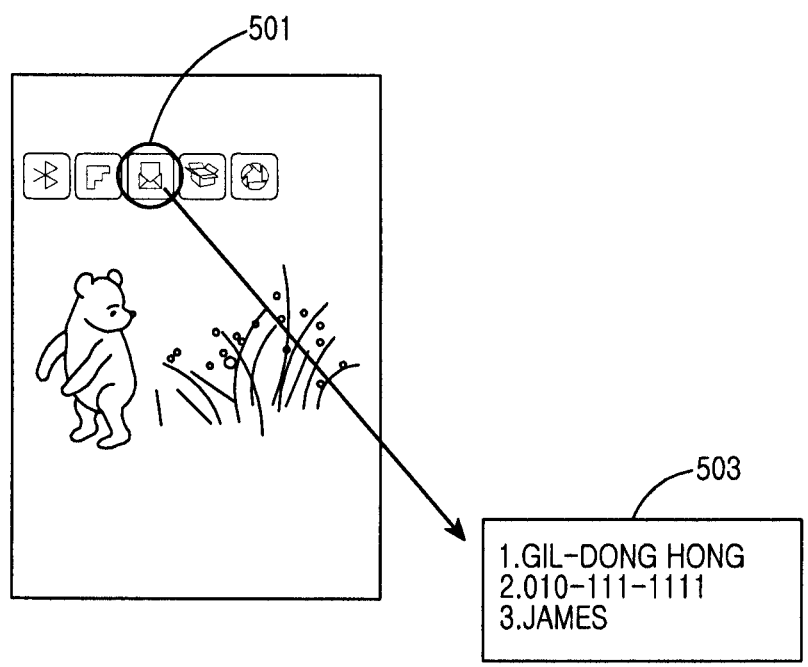
FIG. 5 is a diagram illustrating an example of displaying an application screen indicating detailed information related to the use of image contents in an electronic device according to an exemplary embodiment of the present invention.
Figure 6:
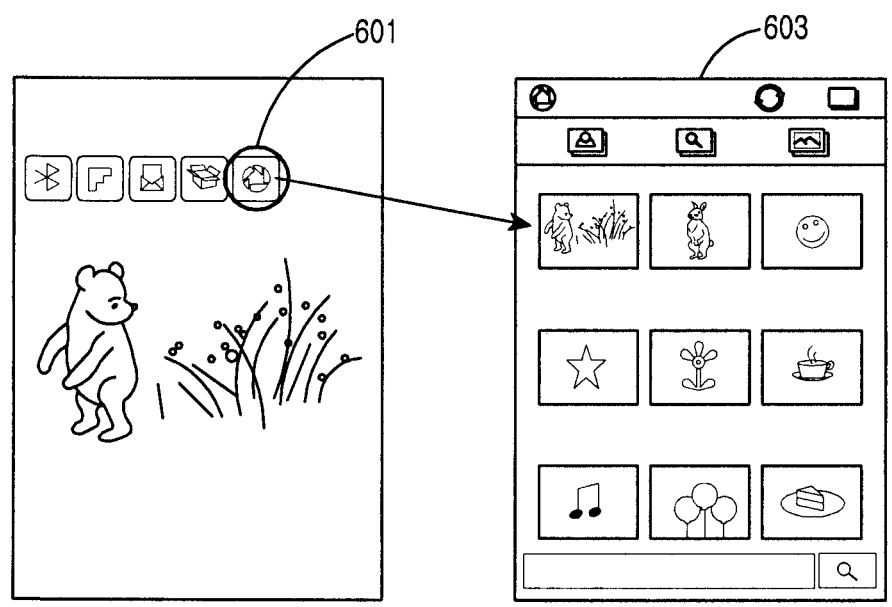
FIG. 6 is a diagram illustrating an example of displaying an application screen indicating detailed information related to the use of contents in an electronic device according to another exemplary embodiment of the present invention.
Figure 7:
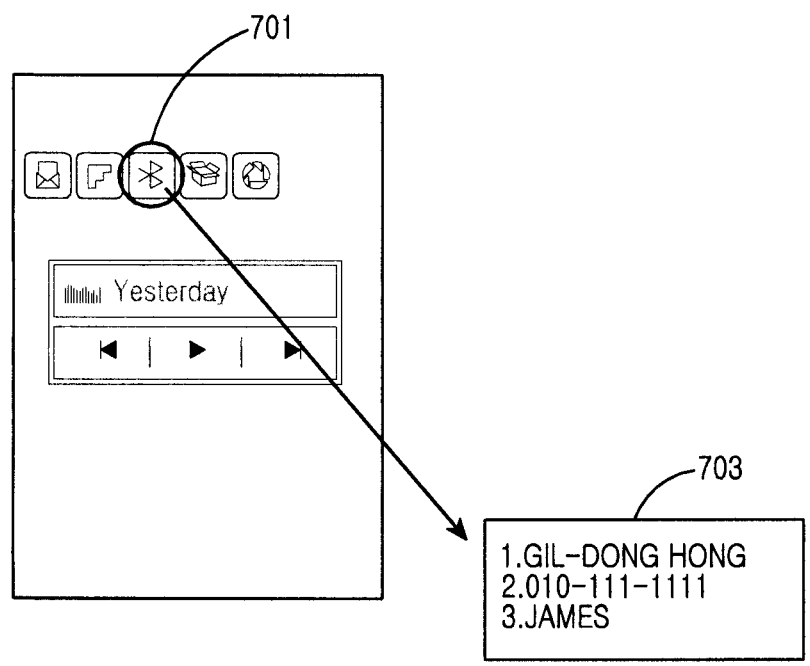
FIG. 7 is a diagram illustrating an example of displaying an application screen indicating detailed information related to the use of contents in an electronic device according to a further exemplary embodiment of the present invention.

If it is sensed in step 309 that a displayed icon is touched, the electronic device 100 proceeds to perform step 311 and displays information that the contents are used by the application represented by the touched icon. For example, as illustrated in FIG. 5, if a touch for a displayed message application 501 is sensed, the electronic device 100 can display user names and phone numbers 503 of other electronic devices to which image contents have been transmitted by the message application. At this time, the electronic device 100 can display the user names and phone numbers 503 by a new window of a pop-up form or can turn and display a displayed page. In another example, as illustrated in FIG. 6, if a touch for a displayed image sharing application 601 is sensed, the electronic device 100 can execute the image sharing application 601 and then, display a page 603 of image contents shared by the image sharing application 601. As a further example, as illustrated in FIG. 7, if a touch for a Bluetooth application 701 is sensed, the electronic device 100 can display user names and phone numbers 703 of other electronic devices to which current music contents have been transmitted by the Bluetooth application 701. After that, the electronic device 100 terminates the procedure according to an exemplary embodiment of the present invention.

In contrast, if it is determined in step 305 that there is not the application having used the contents, the electronic device 100 proceeds to perform step 315 and displays the contents and then, terminates the procedure according to the exemplary embodiment of the present invention.

The apparatuses and methods of the disclosure can be implemented in hardware, and in part as firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed disclosure. Under the broadest reasonable interpretation, the appended claims constitute statutory subject matter in compliance with 35 U.S.C. §101.

The definition of the terms "unit" or "module" as may be referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

Exemplary embodiments and all function operations described in this specification can be carried out by computer software in conjunction with hardware including a structure disclosed in this specification and equivalent structures thereof, firmware, or hardware, or by a combination of them. Also, the exemplary embodiments of the present invention described in this specification can be carried out by one or more computer program products, i.e., data processing devices or can be implemented by one or more modules of computer program instructions encoded on a computer readable medium for controlling an operation of this device.

The non-transitory computer readable medium can be a machine readable storage medium, a machine readable storage substrate, a memory device, a construction of materials affecting a machine readable radio wave stream, or a combination of them. The term of 'data processing device' includes, for example, circuitry such as a programmable processor, computer or multi processor, or all equipment, devices and machines for data processing including a computer. The equipment can include a code added to hardware and creating an execution environment for a corresponding computer program, for example, a code constructing a processor firmware, a protocol stack, a database management system, an operating system or a combination of them.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method executed via an electronic device, the method comprising:
    detecting, via the electronic device, display of a content item;
    in response to detecting display of the content item, overlaying the content item with a plurality of icons retrieved from a storage unit that corresponds to a usage history such that a plurality of previously executed applications are represented by at least two of the plurality of icons, wherein the plurality of previously executed applications have previously shared the displayed content item;
    detecting, via the electronic device, a user selection of one of the plurality of icons corresponding to one of the plurality of previously executed applications associated with the displayed content item; and
    in response to detecting the user selection, displaying, via the electronic device, information corresponding to a sharing history associated with the displayed content item and the one of the plurality of previously executed applications corresponding to the detected user selection,
    wherein the plurality of previously executed applications comprises:
    a first application that has previously uploaded the content item to a server, wherein selection of an icon corresponding to the first application causes the electronic device to display information corresponding to an identification of a page to which the content item has been uploaded, and a second application that has previously transmitted the content item to another electronic device, wherein selection of an icon corresponding to the second application causes the electronic device to display information corresponding to an identification of the another electronic device to which the content item has been transmitted.

2. The method of claim 1, wherein the identification of the another electronic device comprises at least one of an Internet Protocol (IP) address of the another electronic device, a device number, a user name, and a phone number.

3. An electronic device comprising:
    one or more processors controlling a display of one or more groups of content executed by computer programs;
    a touch-sensitive display for detecting the presence and location of a touch;
    a non-transient memory for storing data and instructions; and
    one or more programs stored in the memory and configured to be executable by the one or more processors,
    wherein the program comprises an instruction of detecting display of a content; in response to detecting display of the content item,
    overlaying the content item with a plurality of icons retrieved from a storage unit that correspond to a usage history such that a plurality of previously executed applications are represented by at least two of the plurality of icons, wherein the plurality of previously executed applications have previously shared the displayed content item;
    detecting a user selection of one of the plurality of icons corresponding to one of the plurality of previously executed applications associated with the displayed content item; and
    in response to detecting the user selection, displaying on the touch-sensitive display information corresponding to a sharing history associated with the displayed content item and the one of the plurality of previously executed applications corresponding to the detected user selection,
    wherein the plurality of previously executed application comprises: a first application that has previously uploaded the content item to a server, wherein selection of an icon corresponding to the first application causes the electronic device to display information corresponding to an identification of a page to which the content item has been uploaded; and
    a second application that has previously transmitted the content item to another electronic device, wherein the selection of an icon corresponding to the second application causes the electronic device to display information corresponding to an identification of the another electronic device to which the content item has been transmitted.

4. The electronic device of claim 3, wherein the identification of the another electronic device comprises at least one of an Internet Protocol (IP) address of the another electronic device, a device number, a user name, and a phone number.

5. A non-transient computer readable storage medium storing one or more programs comprising instructions of, when executed by an electronic device, instructing the device to perform a method in the electronic device, the method comprising:
    detecting display of a content;
    in response to detecting display of the content item overlaying the content item with a plurality of icons retrieved from a storage unit that correspond to a usage history such that a plurality of previously executed applications are represented by at least two of the plurality of icons, wherein the plurality of previously executed applications have previously shared the displayed content item;
    detecting a user selection of one of the plurality of icons corresponding to one of the plurality of previously executed applications associated with the displayed content item; and
    in response to detecting the user selection, displaying on the touch-sensitive display information corresponding to a sharing history associated with the displayed content item and the one of the plurality of previously executed applications corresponding to the detected user selection,
    wherein the plurality of previously executed application comprises: a first application that has previously uploaded the content item to a server, wherein selection of an icon corresponding to the first application causes the electronic device to display information corresponding to an identification of a page to which the content item has been uploaded; and
    a second application that has previously transmitted the content item to another electronic device, wherein the selection of an icon corresponding to the second application causes the electronic device to display information corresponding to an identification of the another electronic device to which the content item has been transmitted.

* * * * *